April 12, 1949.  F. WEISS  2,466,977
MACHINE FOR WINDING CAPACITORS
Filed Nov. 29, 1946
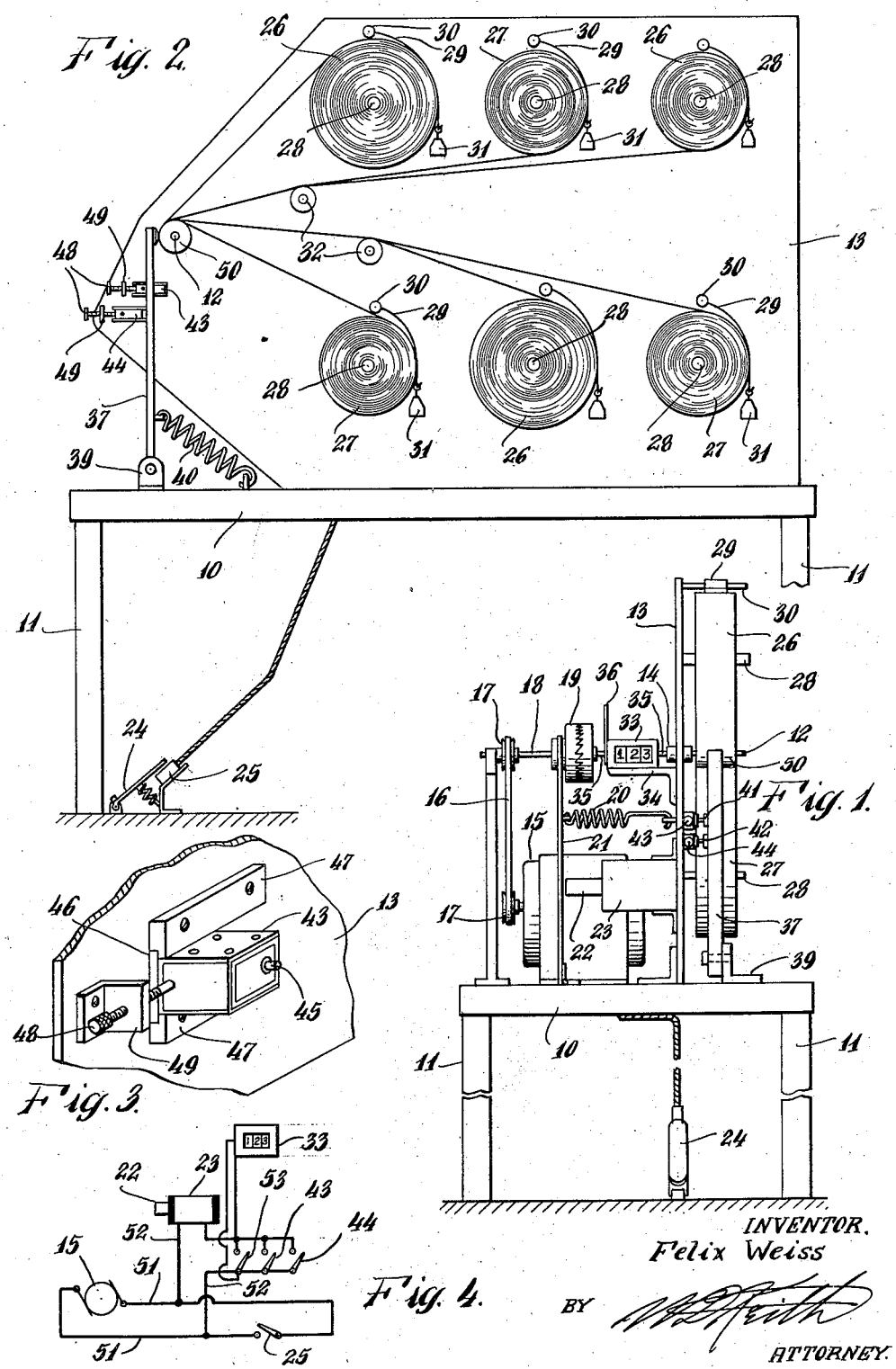
Fig. 2.
Fig. 3.
Fig. 4.
Fig. 1.
INVENTOR.
Felix Weiss
BY 
ATTORNEY.

Patented Apr. 12, 1949

2,466,977

UNITED STATES PATENT OFFICE 2,466,977

MACHINE FOR WINDING CAPACITORS

Felix Weiss, Brookline, Mass., assignor to Cornell-Dubilier Electric Corporation, South Plainfield, N. J., a corporation of Delaware Application November 29, 1946, Serial No. 713,146

3 Claims. (Cl. 242—55)

This invention relates to improvements in winding mechanisms of the type conventionally adapted to wind together alternate layers of metal foil and a fibrous material, such as paper, to form the body of an electrical capacitor or condenser. Such mechanisms usually include as a principal element a power driven mandrel on which the layers of paper and foil are wound, the paper and foil being continuously drawn from coiled or spooled supplies of such materials during the winding operation. When the body being wound from these supplies builds on the mandrel to the desired thickness or diameter, the winding operation is terminated and the wound body severed from the supply of paper and foil and withdrawn from the mandrel. Thereafter the ends of the paper and foil supply are again attached to the mandrel and the operation continued.

In using such machines for the successive production of a plurality of capacitor bodies of approximately the same electrical characteristics and capacity, considerable difficulties are encountered because of variations occurring either in the thickness of the supply of fibrous material or in the tension applied to the fibrous material and the foil during the winding operation. Such variations affect the spacial separation of the metallic foils in the resultant capacitor bodies and, consequently, the electrical capacity of such bodies. Thus it is that even under the best of conditions experienced winding machine operators are often unable to successively produce capacitor bodies having capacities not widely variant from predetermined standards or specifications.

One object of this invention is to provide winding mechanisms on which even inexperienced operators may successively produce capacitor bodies to close commercial tolerances or standards of electrical capacitors. A further object is to provide, in combination with a driven mandrel, control devices which will respond to deviations in winding conditions in such manner as to inform the operator of the necessity for adjustment and variation of said conditions and the type of adjustment or variation required. A further object is to provide a winding device constructed to prevent an operator from unknowingly winding a succession of capacitor bodies of varying capacities.

The realization of these and related objects is achieved, in accordance with the principles of this invention, by providing, in operable combination with a winding mandrel upon which the capacitor is to be wound, a power means for driving said mandrel, a device for stopping the mandrel after it has made a predetermined number of turns, a device for stopping the mandrel when the body being wound thereon exceeds a predetermined diameter or thickness, and means by which the operator may determine which of said devices has caused termination of the winding operation if, in fact, the devices have not acted substantially simultaneously.

The invention will be described with reference to the winding device illustrated in the drawings, which device embodies basic winding movements and means typical of various capacitor winding devices. In the drawings:

Fig. 1 is a front view of a capacitor winding machine;

Fig. 2 is a side view of the machine of Fig. 1 as viewed from the right thereof;

Fig. 3 is a close-up view of an adjustable switch element; and

Fig. 4 diagrammatically illustrates the elements of the controlling circuit of the machine.

Referring to Figs. 1 and 2 of the drawings, the machine is mounted on a base 10 which is held at suitable height by legs 11. The single winding mandrel 12 is rotatable on the plate 13 by means of the bearing 14. A motor 15, operating through belt 16 and suitable pulleys 17, drives the shaft 18 which, through the clutch 19, drives the winding mandrel 12. A spring 20 normally holds the clutch arm 21 in engaging position unless the bar 22, operated by the action of solenoid 23, moves to press clutch arm 21 outwardly against the tension of spring 20 thereby disengaging the clutch. A foot pedal 24 is provided to actuate a main switch 25 by which the operator may stop or start the motor 15. The rolled supplies of paper 26 and the rolled supplies of foil 27 are rotatably positioned and held on the plate 13 by means of the fixed axles 28. The leather bands 29 attached to rods 30 fixed to plate 13 are adapted to carry weights 31 and are so positioned as to exert a braking or dragging action of the movement of the paper and foil rolls thus insuring even feeding of the paper and foil to mandrel 12 during the winding operation and preventing overrun of these rolls at the end of a winding operation. The magnitude of this braking action is governed by the size of the weights 31. Rollers 32 are positioned on plate 13 to serve as supports and guides for the paper and foil strips as they travel from rolls 26, 27 to the mandrel 12.

The machine as thus described is typical of the basic design of winding machines for capacitors, whether those machines are of a single mandrel or multiple mandrel type.

Referring to Fig. 1, a conventional counter mechanism 33 is mounted on plate 13 by means of bracket 34 and so positioned that its counter shaft 35 forms a driving connection between the clutch 19 and the winding mandrel 12. This counter mechanism is set to count each full rotation of mandrel 12. Preferably the counter mechanism bears a recording face as shown, a lever 36 being provided so that the operator may return the recording face to a zero set at convenient intervals. The counter mechanism 33 is electrically connected in circuit with solenoid 23 so that by suitable predetermined adjustment the solenoid 23 may be actuated after a stipulated number of revolutions of winding mandrel 12 have been recorded.

Referring to Figs. 1 and 2, a following arm 37, on the extremity of which is mounted the pad 38, is mounted on base 10 by means of bracket 39, a spring 40 extending between arm 37 and base 10, serving to firmly but yieldingly position the arm 37 so that pad 38 will lightly press against mandrel 12 or any capacitor body 50 which is wound on said mandrel. Arm 37 likewise has fixed thereto the two knife-edge elements 41 and 42.

Adjustably positioned on plate 13 are the switches 43 and 44, one of which is shown in enlarged view in Fig. 3. Each such switch has a trip element 45 projecting therefrom and each switch 43 and 44 is so positioned on plate 13 that the trip element thereof lies in the path of a knife-edge 41 or 42 as arm 37, to which said edge elements are attached, is moved outwardly against the tension of spring 40 as the diameter of capacitor 50 builds up on winding mandrel 12.

Each switch 43 and 44 is fixedly mounted on a bed plate 46 which is movably held against the surface of plate 13 by the channeled bars 47. Thumbscrews 48 operating in brackets 49 fixed to plate 13 provide means by which each of the switches 43, 44 may be translated on its bed plate 46 back and forth along the path formed by the channeled bars 47. Each switch 43, 44 is positioned in a circuit controlling solenoid 23 so that the solenoid is actuated when a knife edge element 41, 42 contacts switch trip element 45.

It will thus be understood that current may be passed to solenoid 23, causing bar 22 to move clutch arm 21 and disengage clutch whenever the action of counter mechanism 33 or the action of microswitch 43 or 44 closes a solenoid circuit. The controlling circuit of the winding machine is diagrammed in Fig. 4. The main circuit 51, connecting a power source not shown, powers the motor 15 and is controlled by switch 25. The solenoid circuit 52 is connected to main circuit 51 and is normally open, the solenoid 23 being energized to move bar 22 outwardly only when switch 53 is closed by the action of the counter mechanism 33 or switch 43 or 44 is closed by the action of the arm 37. The switch 43 present in this preferred embodiment of the invention is a supplementary means, as will later be described, not necessary to the operation of the basic principles thereof.

In operation of the mechanism just described, in the winding of capacitor bodies of predetermined capacity, the number of convolutions of foil and paper necessarily wound on the mandrel 12 to produce a body of desired capacity is first calculated and the counter mechanism 33 is then so adjusted that, when the mandrel has made the necessary rotations to produce the required convolutions of foil and paper on the mandrel, the counter mechanism will act to open switch 53 thereby stopping the winding operation, thereby energizing solenoid 23 and causing bar 22 to move to disengage clutch 19 and halt the winding operation. Likewise the desired diameter of the finished capacitor is calculated and by means of thumbscrew 48 the position of switch 44 on plate 13 is so adjusted that knife edge 42 of the arm 37 will operate the switch trip 45 of switch 44 as arm 37 is forced by the increasing diameter of the capacitor being wound on mandrel 12 to the point which represents the calculated capacitor diameter desired. These adjustments having been made, the ends of paper and foil drawn from supply rolls 26 and 27 are attached to mandrel 12 and switch 25 is closed starting motor 15 and, consequently through clutch 19, the winding operation.

If the operation proceeds correctly, it is apparent that when a capacitor body of desired characteristics has been wound on mandrel 12, the body will have reached the predetermined diameter at substantially the same time that the mandrel 12 will have made the number of rotations necessary to produce the predetermined number of convolutions of foil and paper on the mandrel, and therefore arm 37 will operate to close limit switch 44 at substantially the same time that the counter mechanism 33, having counted the predetermined number of revolutions of the mandrel 12, will likewise operate to close switch 53. If, however, the tension placed upon the foil and paper by action of tension devices 29 is in excess of that required, the predetermined number of convolutions of foil and paper will be built up upon the mandrel before the capacitor body built on the mandrel has reached the predetermined diameter, in which case counter mechanism 33 will operate to close switch 53 and, through action of solenoid 23, disengage clutch 19 and stop the winding operation at a time when the switch arm 37 has not yet contacted the trip 45 of limit switch 44. The same sequence of operations will be produced if the thickness of the paper being supplied from supply rolls 26 is less than had previously been calculated. Conversely, if the thickness of the paper as it is supplied to mandrel 12 is greater than the thickness upon which calculations had been based, or if the tension is such as to allow an undesirable amount of looseness on the mandrel, the diameter of the capacitor body 50 being wound on the mandrel will reach its predetermined point prior to the time the mandrel has made the predetermined number of rotations, with the result that the action of arm 37 will close switch 44 to operate solenoid 23 and thereby stop the winding operation prior to the time that the mandrel has completed the theoretically required number of revolutions, thus indicating to the operator that adjustments must be made.

The usefulness of a machine embodying the principles of my invention is apparent from what has been said above. As is well known, fibrous material, such as paper, usually varies by at least 10 per cent in thickness, and tension devices, no matter how carefully regulated, have a tendency to vary from time to time during a series of winding operations. Either or both of these faults may, however, be immediately observed and corrected even by inexperienced operators when a machine embodying the principles of this invention is used in the winding of capacitor bodies, and a defectively made capacitor body may be immediately detected and adjustments promptly made in the machine to prevent the next winding operation from producing a defective product.

During operation of the illustrated embodiment of this invention the operator may visually determine from the recording face of the counter mechanism 33 and from the relation of the switch arm 34 to the trip 45 of limit switch 44 whether these control means have operated simultaneously, indicating a properly formed condenser, or which one has operated substantially ahead of the other, indicating an improperly formed condenser and likewise indicating what types of adjustment are necessary. It will be apparent, however, that in other embodiments of my invention the counter mechanism may have no recording face or the diameter measuring means may operate in a mechanically different manner or under circumstances where its operating parts are concealed, in either of which cases visual or audible telltales, such as lights or bells, may be placed in circuit with the control devices to indicate to the operator the respective order of their action in terminating the winding operation.

The illustrated mechanism also contains, as described, an added feature useful where it is desirable to insert a tab within the convolutions of capacitor body 50 to serve as a means of connecting the terminals of a finished capacitor to the foil elements of the capacitor body. The feature consists of the additional switch 43 which, through manipulation of its thumbscrew 48, may be positioned on plate 13 so that its switch trip 45 will be contacted by knife edge 41 on arm 37 before that arm has been moved sufficiently to operate switch 44. Thus switch 43 may be utilized to stop the winding operation at any intermediate point to insert a tab therein or perform similar operations.

My invention is not limited to the mechanical details herein shown in the specific illustration thereof, except as the same may be set forth in the appended claims.

I claim:

1. In a winding machine adapted to wind together on a mandrel layers of metallic foil and fibrous material to form the body of an electrical capacitor, in combination, a winding mandrel, power means for driving said mandrel, a counter mechanism for measuring the revolutions of said mandrel, means for continuously measuring the diameter of the body being wound on the mandrel, means actuated by said counter to stop said mandrel at the end of a predetermined number of turns, and means actuated by said diameter measuring means to stop said mandrel when the body wound thereon has reached a predetermined diameter, said means actuated by said counter and said means actuated by said diameter measuring means operating independently to stop said mandrel.

2. In a winding machine adapted to wind together on a mandrel layers of metallic foil and fibrous material to form the body of an electrical capacitor, in combination, a winding mandrel, power means for driving said mandrel, a counter mechanism for measuring the revolutions of said mandrel, means for continuously measuring the diameter of the body being wound on the mandrel, means actuated by said counter to stop said mandrel at the end of a predetermined number of turns, and means actuated by said diameter measuring means to stop said mandrel when the body wound thereon has reached a predetermined diameter, said means actuated by said counter and said means actuated by said diameter measuring means operating independently to stop said mandrel, the action of said counter mechanism and the action of said diameter measuring means being apparent whereby indication of the order of their operation is conveyed to the operator of said machine.

3. In a winding machine adapted to wind together on a mandrel layers of conducting material, in combination, a winding mandrel, power means for driving said mandrel, a counter mechanism for measuring the revolutions of said mandrel, means for continuously measuring the diameter of the body being wound on the mandrel, means actuated by said counter to stop said mandrel at the end of a predetermined number of turns, and means actuated by said diameter measuring means to stop said mandrel when the body wound thereon has reached a predetermined diameter, said means actuated by said counter and said means actuated by said diameter measuring means operating independenly to stop said mandrel.

FELIX WEISS.

REFERENCES CITED

The following references are of record in the file of this patent:

UNITED STATES PATENTS

| Number | Name | Date |
| --- | --- | --- |
| 1,881,170 | Butler | Oct. 4, 1932 |
| 2,199,603 | Ackley | May 7, 1940 |